June 15, 1948.  E. E. MILLER  2,443,191
RESILIENT SAFETY BELTING
Filed Sept. 3, 1946
Fig-1-
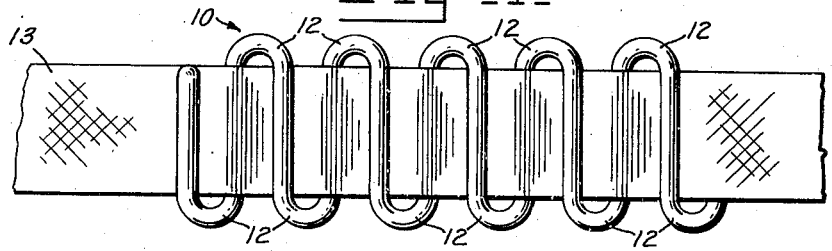
Fig-2-
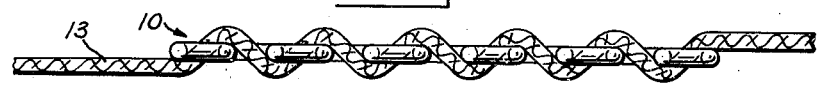
Fig-3-
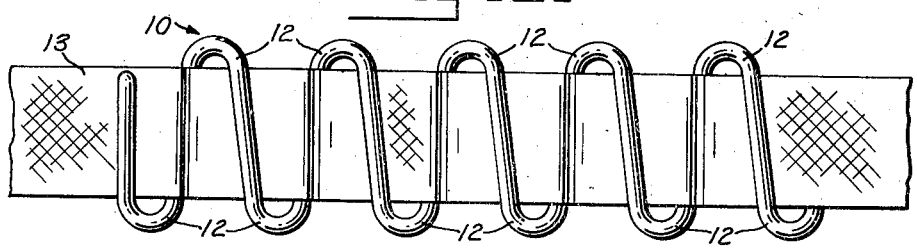
Fig-4-
Fig-5-
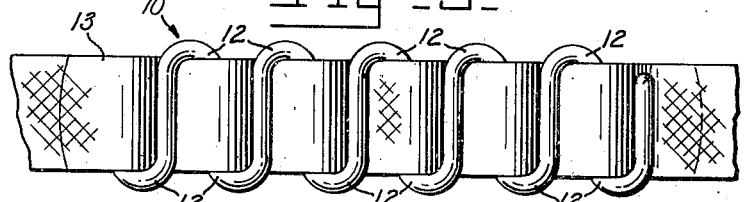
Fig-6-
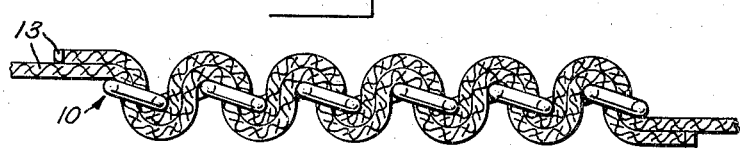
INVENTOR.
Erwin E. Miller
BY
*J. H. Church + H. E. Thibodeau*
ATTORNEYS Patented June 15, 1948

2,443,191

UNITED STATES PATENT OFFICE 2,443,191

RESILIENT SAFETY BELTING

Erwin E. Miller, Ravenna, Ohio

Application September 3, 1946, Serial No. 694,446

2 Claims. (Cl. 244—122)

(Granted under the act of March 3, 1883, as amended April 30, 1928; 370 O. G. 757)

The invention described herein may be manufactured and used by or for the Government for governmental purposes, without payment to me of any royalty thereon.

This invention relates to an improved type of safety belting.

In many cases, belting of flexible cotton webbing, or the like, requires greater resiliency than can be provided merely through the inherent "stretch" of such belting. In aircraft, for instance, the shock of landing is customarily taken up by a safety belt both in the case of personnel and of cargo, and if such belting has sufficient elasticity, the forward momentum of the occupants or the cargo in the plane will be adequately cushioned without any danger of snapping or breakage of the belting as a result of the excessive strains encountered in particularly rough landings.

In ordinary types of flexible cotton web belting, the resiliency and stretch necessary for cushioning the forward inertia of the occupants or cargo of a plane upon deceleration thereof is obviously inadequate. Moreover in prior art means of combining a spring with web belting for such purposes, failure of the spring customarily results in failure of the entire safety belting.

It is a purpose of this invention to provide an improved type safety belting whereby a strip of belting material can be combined with a so-called wave-type spring without the aid of fastening devices.

Another purpose of this invention is to provide an improved type safety belting whereby a strip of belting material can be combined with a so-called wave-type spring in such manner that improved operating characteristics thereof result as the height of the loops of such spring increases.

Still another purpose of this invention is to provide an improved type safety belting wherein failure of the spring will not necessarily result in functional failure of the belting.

It is a particular purpose of this invention to provide an improved type safety belting wherein excessive rebound is substantially eliminated, such safety belting therefore being especially adapted for use in aircraft.

As will appear, the above purposes have been accomplished by combining ordinary web belting with what can be referred to as a "wave-type" spring in a novel manner to be described, whereupon the ability of such belting to elongate is greatly increased when a load is applied thereto.

The specific nature of the invention as well as other objects and advantages thereof will clearly appear from a description of a preferred embodiment as shown in the accompanying drawing in which:

Fig. 1 is a plan view showing a strip of belting interlaced with a so-called wave type spring, such combination in a normal state of rest with no tension applied thereto;

Fig. 2 is an edge view of what is shown in Fig. 1;

Fig. 3 is a plan view showing the combination of Fig. 1 but with tension applied thereto;

Fig. 4 is an edge view of what is shown in Fig. 3;

Fig. 5 is a plan view showing a modification of the safety type belting of this invention; and Fig. 6 is an edge view of what is shown in Fig. 5.

In Figs. 1 and 2 there is shown a spring 10 comprising a plurality of U-shaped loops 12, all of which normally lie in the same plane. Spring 10 may be fabricated of uniform section throughout or may be a combination of a round section for the curved portion of loops 12 with another type section for the sides of loops 12. Since the open ends of adjacent loops face in opposite directions, such spring 10 may be referred to as a "wave-type" spring.

A strip of cotton web belting 13, or any other relatively non-resilient material, is laced through each succeeding U-shaped loop 12 as shown in the drawing. Thus, spring member 10 is associated with belting 13 without the aid of any additional fastening means. The strip 13 of belting material may be of any width which can be laced through loops 12 of spring 10, but it is preferred that the width be slightly less than the height of loops 12 for the best results.

When tension is applied to the combined belting and spring, any existing slack between belting 13 and the sides of loops 12 in spring 10 is first taken up. Continuation of such tension exerts a combination of torque and bending action on the sides of loops 12 which thereby spread apart and elongate the assembly as shown in Figs. 3 and 4. It is apparent then that as belting 13 approaches a straight line, spring 10 offers greater resistance to tension. When the maximum elongation of belting 13 is reached, the stress exerted on spring 10 also reaches a maximum and any additional tension acts directly upon belting 13.

By presetting the side of each loop 12 at any desired angle to the longitudinal axis of spring 10, as shown in Fig. 6, the action of such spring will first be obtained in torque rather than in bending. The size of such angle is naturally that which will yield the optimum results for the particular use for which the safety belting is intended. Thus, greater resistance to the elongation of belting 13 is achieved until such time, of course, as the sides of each loop 12 are forced into substantially the same plane, whereupon the same bending action as explained for Fig. 2 is then obtained.

Another feature obtained by lacing belting into a spring of the type here described is the tendency of the belting to resist springing back to the position held before tension was applied thereto. When the safety belting of this invention is under a load, considerable frictional resistance is encountered by the strip of belting material being forced against the parallel sides of the U-shaped loops 12 and, even though the load may decrease appreciably, the spring will not have sufficient recuperative power to overcome the load plus the friction to regather the belting. This feature is particularly advantageous in such cases as harness belts in parachutes since the safety type belting of this invention acts as a one way shock absorber eliminating rebound.

Still another feature of lacing a belting into a spring as shown in the drawing is the resulting improvement in operating characteristics as the spring increases in width. In the combination of the type herein described, an increase in the height of the U-shaped loops permits an increase in the amount of torque action of the belting upon the sides of the loops prior to the attainment of bending action thereby yielding greater resiliency.

More than one ply of belting 13 may be used in both constructions of the safety belting but is especially advantageous in the case where the parallel sides of the loops are angularly preset with respect to the longitudinal axis of the spring as illustrated in Fig. 6. It is apparent that no fastening means need be used to combine the plies of belting material since the method of lacing and the friction of the belting with the spring, as tension is applied, serves to keep the plies firmly secured in place. The ends of each ply, if so desired, can be fastened to different objects such as, in the case of aircraft, the pilot's seat and the fuselage of the plane. Thus, should one ply give way, the other will maintain the characteristics of the belt in conjunction with the spring, thereby providing an added safety feature against snapping or breaking of the belting.

The belting utilized in carrying out this invention is preferably of cotton webbing although other materials may also be used advantageously and be within the scope of the invention, provided such materials are associated with the springs of this invention in the manner shown in the drawing.

Thus, there is here provided a method of reinforcing flexible or semi-flexible belting of any relatively non-elastic material by lacing such belting through the successive U-shaped loops of a so-called wave-type spring. In such construction, it is readily apparent that no fastening means or devices are required.

It is also desired to stress an outstanding safety feature of the belting of this invention. Should the spring fail by fracture due to a possible defect in material, the broken parts of the spring will continue to function in the manner previously described and the belting will continue to elongate. In other words, there will be no sudden collapse of the assembly.

Moreover, unlike ordinary type springs, the invention herein described improves in operating characteristics as the height of the loops increases due to the greater percentage of torque action over bending action of the U-shaped loops in the case where the parallel sides thereof are angularly preset with the longitudinal axis of the spring. By utilizing the lacing method of combining belting with wave-type spring, advantages of resistance to rebound are obtained which are particularly adapted to safety type belting for aircraft.

I claim:

1. In a safety type belting adapted to elongate as tension is applied thereto, the combination of, a spring having a plurality of U-shaped adjacent loops with the open ends thereof facing in opposite directions and with the sides thereof preset at an angle to the longitudinal axis of said spring, and a strip member of relatively non-resilient belting laced through successive loops of said spring, all adapted and arranged whereby the application of a load to said safety belting first creates a torque bringing said sides of said loops substantially parallel to one another so as to lie in the same plane, and whereby increased loading results in the elongation of said safety belting due to a combined torque and bending action which spreads apart said loops as said strip member tends to approach a straight line.

2. In a safety type belting adapted to elongate as tension is applied thereto, the combination of, a spring having a plurality of U-shaped adjacent loops, said loops having the open ends thereof facing in opposite directions and with the sides thereof preset at an angle to the longitudinal axis of said spring, and a plurality of plies of relatively non-resilient strips of belting material laced through successive loops of said spring, each of said plies being secured at their respective ends to different supports for increasing the safety factor of said belting, all adapted and arranged whereby the application of a load to said safety belting results in the elongation thereof, due to a combined torque and bending action which spreads apart said loops as said strips of belting tend to approach a straight line.

ERWIN E. MILLER.

REFERENCES CITED

The following references are of record in the file of this patent:

UNITED STATES PATENTS

| Number | Name | Date |
| --- | --- | --- |
| 193,987 | Moore | Aug. 7, 1877 |
| 200,561 | Moore | Feb. 19, 1878 |